(12) United States Patent
Chung et al.

(10) Patent No.: US 7,579,049 B2
(45) Date of Patent: Aug. 25, 2009

(54) NANO-STRUCTURED INORGANIC ZINC PHOSPHATE CORROSION PROTECTIVE COATING FOR METAL ALLOYS

(75) Inventors: Young J. Chung, Calabasas, CA (US); Melitta M. Hon, Daly City, CA (US); Martin W. Kendig, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 865 days.

(21) Appl. No.: 10/885,197

(22) Filed: Jul. 6, 2004

(65) Prior Publication Data
US 2009/0192251 A1    Jul. 30, 2009

(51) Int. Cl.
*B05D 7/14*    (2006.01)
*C07F 7/18*    (2006.01)
*C09D 183/04*  (2006.01)

(52) U.S. Cl. .................. 427/409; 427/419.2; 427/419.8
(58) Field of Classification Search ............... 427/409, 427/419.2, 419.8; 106/287.1, 287.13–287.16, 106/287.23, 287.26, 287.29
See application file for complete search history.

(56) References Cited

U.S. PATENT DOCUMENTS

| | | | |
|---|---|---|---|
| 4,814,017 A | 3/1989 | Yoldas et al. | |
| 5,814,137 A | 9/1998 | Blohowiak et al. | |
| 5,939,197 A | 8/1999 | Blohowiak et al. | |
| 6,579,472 B2 | 6/2003 | Chung et al. | |
| 2003/0024432 A1* | 2/2003 | Chung et al. | 106/14.12 |

* cited by examiner

*Primary Examiner*—William Phillip Fletcher, III
(74) *Attorney, Agent, or Firm*—Alston & Bird LLP

(57) ABSTRACT

A method is provided for enhancing corrosion resistance of a metal surface that includes the step of forming a sol-gel coating in which nanostructured zinc phosphate ($Zn_3(PO_4)_2$) and zinc oxide (ZnO) phases are present in the mixture. The method may include the steps of mixing an organosilane, organometallic, organic acid, water, and alcohol, and allowing the components of the mixture to partially hydrolyze, followed by adding at least one component having zinc functionality and at least one component having phosphate functionality to the partially hydrolyzed mixture, wherein the zinc component and phosphate component are added in a molar ratio of from about 1.5:1 to about 5:1 ($Zn:PO_4$). The resulting mixture can be applied as a coating to a metal surface to improve the corrosion resistance of the metal and to enhance the adhesion of resinous materials to the metal surface.

14 Claims, 2 Drawing Sheets

NANO-STRUCTURED INORGANIC ZINC PHOSPHATE CORROSION PROTECTIVE COATING FOR METAL ALLOYS

FIELD OF THE INVENTION

The present invention relates to sol-gel coatings for metallic surfaces. More particularly, the present invention relates to a sol-gel coating that acts as a corrosion protective coating that may additionally be used to promote the adhesion of resinous material to a metallic surface.

BACKGROUND OF THE INVENTION

Various coatings have been developed which promote the adhesion of one or more resinous layers to a titanium, aluminum, or other metallic surface such as that used as part of an airplane body.

Some of the coatings improve adhesion by utilizing a sol-gel film between the metal and the resin. The sol-gel films or sol coatings promote adhesion through a hybrid organometallic coupling agent at the metal surface. The metallic portion of the organometallic, which usually contains zirconium, bonds covalently with the metal. The organic portion of the organometallic bonds covalently with the applied layer of adhesive or matrix resin. In this manner, the organometallic based sol-gel creates a metal-to-resin gradient through a layer of the organometallic coupling agent.

The strength and durability of the sol coating depends upon chemical and micro-mechanical interactions at the surface of the metal involving, for example, the porosity and microstructure of the metal and the tendency of the sol coating to rehydrate. When properly implemented, the sol coatings provide high temperature surface stability for paint adhesion, adhesive bonding, or fabrication of structurally superior hybrid laminates.

One of the most effective of the organometallic sols, produced by The Boeing Company of Seattle, Wash., is a dilute solution of a stabilized alkoxyzirconium organometallic salt, such as Zr n-propoxide, and an organosilane coupling agent, such as 3-glycidoxypropyltrimethoxysilane (GTMS) that is used with an acetic acid catalyst. This particular formulation is known as Boe-Gel®.

Although the Boe-Gel® sol has superior adhesive properties, the Boe-Gel® sol formulation has only minimal anti-corrosion characteristics. In most situations in which the Boe-Gel® sol is used to adhere a layer of paint, adhesive, or other compound to the metallic surface of an airplane, the material which is adhered to the metallic surface has anti-corrosive properties, and thus protects the metallic surface from corrosion. Problems arise, however, in situations in which the sol-gel coating may become exposed to the environment or may be used alone, in the absence of an anti-corrosive layer.

In the past, chromate compounds have been used to impart anti-corrosive properties to coatings such as the sol-gels discussed above, but chromates have recently come under scrutiny by the Environmental Protection Agency (EPA) for possible health concerns, and new governmental regulations seek to phase out the use of chromates as corrosion inhibitors.

What is needed is a chromate free sol-gel composition providing the same superior metal to resin adhesive and barrier properties as the alkoxyzirconium organometallic salt gels, but which provides the metallic surfaces with significant anti-corrosion properties without the need of an additional anti-corrosive layer.

SUMMARY OF THE INVENTION

One aspect of the invention is a chromate-free coating which provides superior adhesion, barrier protection, and anti-corrosion properties to a metal surface, and more particularly to an aluminum or titanium surface. The invented coating is an anti-corrosive sol-gel which produces an adhesive film interface between the metal surface and an organic matrix resin or adhesive, and has anti-corrosive properties providing protection for the underlying metal substrate. The invented sol-gel forms a film which promotes adhesion through a hybrid organometallic coupling agent at the metal surface. The anti-corrosive properties of the sol-gel prevent corrosion damage to the covered metal surface even when the sol-gel coating is not covered by an additional resin layer.

The sol-gel results from the combination of an organometallic salt, an organosilane, and zinc and phosphate compounds that result in a nano-structured zinc phosphate-zinc oxide coating that thermally dries to form a visually transparent corrosion protective film. The organometallic component may be selected from a large group of equivalent compounds but is preferably an alkoxyzirconium salt, and most preferably Zr (IV) n-propoxide. The organosilane may also be selected from a large group of equivalent compounds, but is preferably 3-glycidoxypropyltrimethoxysilane (GTMS). Zinc functionality is provided by the addition of Zn salts of volatile low molecular weight organic acids, preferably Zn acetate. Phosphate functionality is provided by addition of phosphate-containing proton acids, typically phosphoric acid.

To formulate the invented sol-gel, the organosilane and organometallic are first combined with an organic acid. The organic acid, preferably acetic acid, acts as a catalyst and as a reaction rate-regulating agent. After being mixed, the organosilane and organometallic are allowed to partially hydrolyze to a first degree, after which the zinc and phosphate components are added to the mixture. After the zinc and phosphate components are added, the components of the sol-gel continue to hydrolyze to a second degree. The sol-gel is applied to a metallic surface, and dries as a coating. The sol-gel is preferably applied before hydrolysis is complete.

Prehydrolyzation of the organometallic component reduces the tendency of the organometallic to react with the later added phosphate. Instead, the zinc reacts favorably with the phosphate to form nano-structured zinc phosphate and zinc oxide.

The invention provides a chromate free sol-gel composition providing the same superior metal to resin adhesive and barrier properties as previous alkoxyzirconium sol-gels, but which provides metallic surfaces with significant anti-corrosion properties without the need of an additional anti-corrosive layer.

BRIEF DESCRIPTION OF THE DRAWINGS

Figure 1:
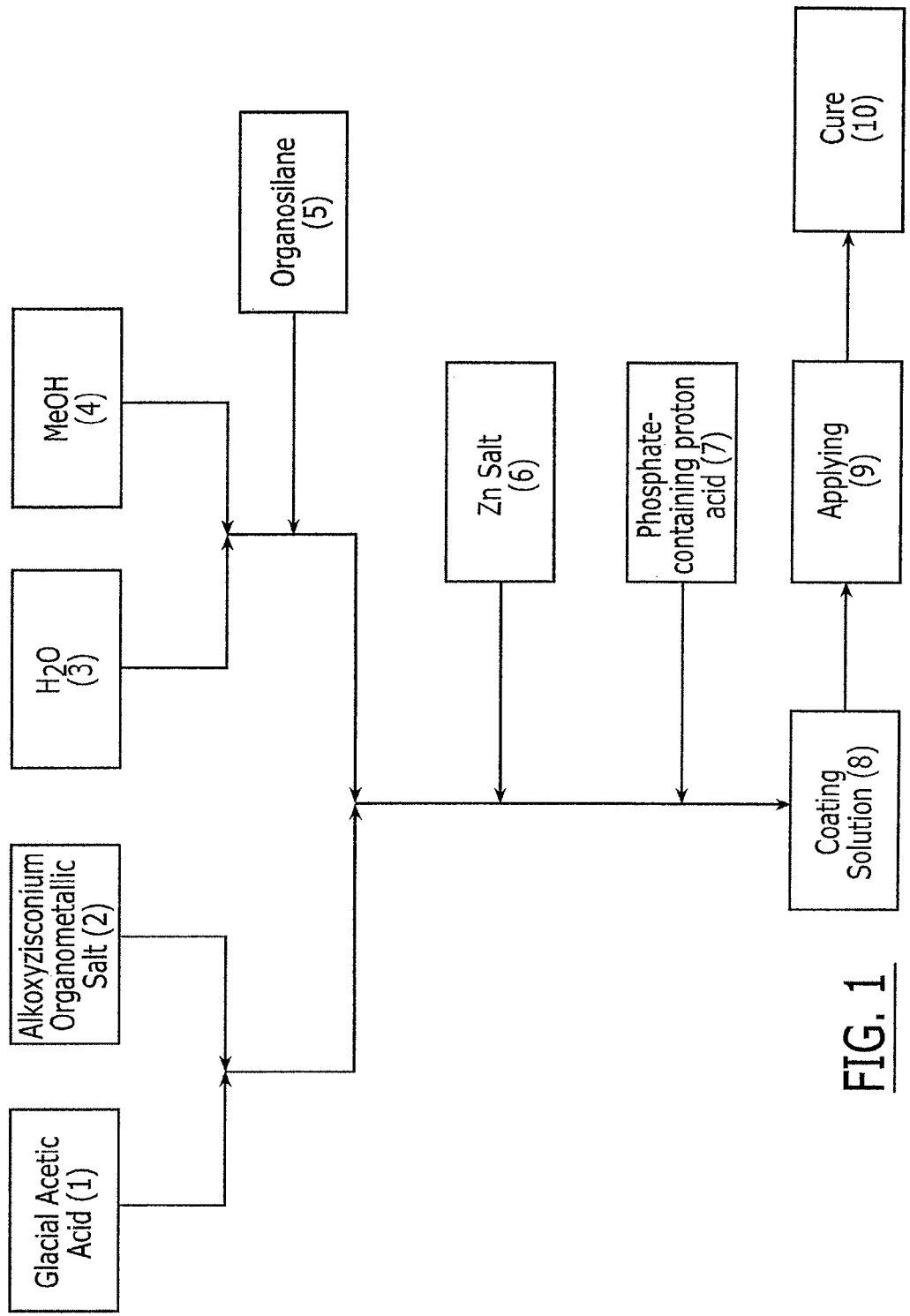
Figure 2:
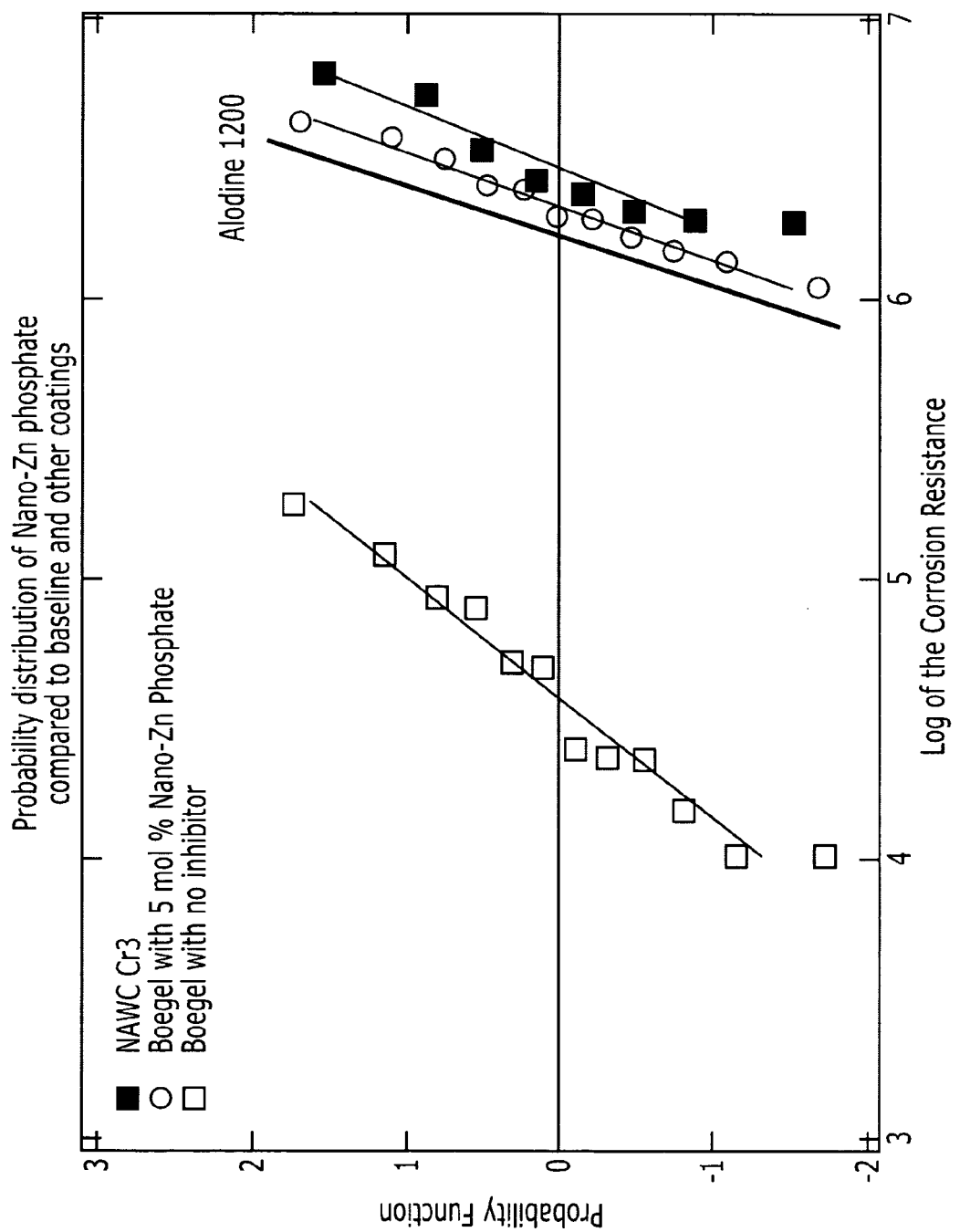

Having thus described the invention in general terms, reference will now be made to the accompanying drawing, which is not necessarily drawn to scale, and wherein:

FIG. 1 is a flow diagram showing an exemplary mixing sequence for formulating the sol-gel according to an embodiment of the invention; and, FIG. 2 is a log normal probability plot of corrosion resistance for populations of test panels of aluminum specimens coated with embodiments of the invented sol-gel containing nanophase zinc phosphate. The corrosion resistance was evaluated from a electrochemical impedance measurement.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The invented anti-corrosive sol-gel includes an organometallic compound, such as an organozirconium compound, and more particularly a Zr (IV) n-propoxide; an organosilane, such as 3-glycidoxypropyltrimethoxysilane (GTMS); a compound with Zn functionality, such as zinc acetate dihydrate; and a compound with phosphate functionality, such as phosphoric acid. The organozirconium compound covalently bonds to the metal surface through the Zr constituent and the organosilane covalently bonds to an organic primer, adhesive, or resin. The zinc and phosphate additives act together to impart anti-corrosive properties to the sol-gel. Also, an organic acid, preferably acetic acid, is used as a catalyst and reaction rate stabilizer.

The term "sol-gel," a contraction of solution-gelation, refers to a series of reactions where a soluble metal species, typically a metal alkoxide or metal salt, hydrolyzes to form a metal hydroxide. The soluble metal species usually contain organic ligands tailored to correspond with the resin in the bonded structure. The metal hydroxides condense (peptize) in solution to form a hybrid organic/inorganic polymer. Depending on reaction conditions, the metal polymers may condense to colloidal particles or they may grow to form a network gel. The ratio of organics to inorganics in the polymer matrix is controlled to maximize performance for a particular application.

The preferred organometallic compound is an alkoxy metallic compound, and more preferably an alkoxy zirconium compound. The preferred zirconium compounds are of the general formula $Zr(OR)_4$ wherein R is a lower aliphatic having 2-5 carbon atoms, especially normal aliphatic groups. Because of its ready commercial availability, Zr (IV) n-propoxide is particularly preferred as the organometallic compound. Alkoxy metallic compounds having branched aliphatic, alicyclic, or aryl groups also perform satisfactorily. In addition to covalently bonding to the metal surface, the organozirconium compound also serves to minimize the diffusion of oxygen to the surface and to stabilize the metal-resin interface.

Glycidoxysilanes are the preferred organosilanes because of their stability in solution and their ability to crosslink with common, aerospace epoxy or urethane adhesives. The silane is acid-base neutral, so its presence in the sol mixture does not increase the relative hydrolysis and condensation rates of the alkoxy metallic compounds. Sols including the organosilanes are relatively easy to prepare and to apply with reproducible results.

A particularly preferred organosilane for use in the invented sol-gel is 3-glycidoxypropyltrimethoxysilane (GTMS). The GTMS includes an active epoxy group which can react with common epoxy and urethane resins. GTMS does not form strong Lewis acid-base interactions with the hydrated metal oxide substrate. Also, the oxide surface of the metal is more accessible to the zirconium organometallic when GTMS is used as the organosilane, allowing the desired stratification of the sol-gel film in essentially a monolayer with the epoxy groups of the silane coupling agents oriented toward the resin layer. The ideal concentration of the sol depends upon the mode of application. A higher concentration may be preferred for drench or spray applications. Use of GTMS with the zirconium organometallic allows strong covalent bonding to develop between the metal substrate and zirconia and silica, as well as maximizing bonding between the epoxy moiety of the GTMS to the resin layer.

The zinc and phosphate components provide the invented sol-gel with anti-corrosive properties. It has been found that the combination of zinc and phosphate functionalities creates nanostructured zinc phosphate ($Zn_3(PO_4)_2$) and zinc oxide (ZnO) phases within the sol-gel and resultant dried coating. These zinc phases increase the anti-corrosive efficacy of the invented sol-gel up to a hundred times over adhesive sol-gels of the prior art. The zinc compounds are preferably present in the sol-gel such that Zn represents between about 0.1 mol % and about 20.0 mol % of solids. The phosphate compounds are advantageously present in the sol-gel such that $PO_4$ represents between about 0.1 mol % and about 10.0 mol % of solids, and more preferably between about 0.1 mol % and about 6.0 mol %. Concentrations of $PO_4$ above about 6.0 mol % and certainly above about 10.0 mol % tend to cause phase separation of the sol-gel and are generally undesirable. A molar excess of Zn to $PO_4$ is advantageously used to provide a favorable distribution of $ZnO:Zn_3(PO_4)_2$ within the coating. Beneficial stoichiometric ratios are from about 1.5:1 to 5:1 ($Zn:PO_4$).

In one embodiment of the sol-gel, the sol-gel comprises a mixture of GTMS and Zr (IV) n-propoxide in a medium of water, methanol, and acetic acid. The GTMS and Zr (IV) n-propoxide are preferably present in a molar ratio between about 2:1 and about 5:1, and most preferably about 5:1. The solids (GTMS and Zr (IV) n-propoxide) comprise about 10% to about 12% of the total mixture, by mass percentage. After mixture of the GTMS and Zr n-propoxide, Zn is added in an amount equivalent to about 5-10 mol % of the solids and phosphate is added in an amount equivalent to about 5-15 mol % of the solids. The predominant component of the mixture is the methanol, at about 80% by mass. The water and acetic acid components of the mixture respectively comprise about 5% and about 1.5% of the mixture, by mass. A slightly higher concentration of reactants may yield better results in some situations, depending on the bonding materials and conditions. The ratio of GTMS to Zr (IV) n-propoxide may be adjusted to obtain the strongest surface adherence for particular metals, application methods, and types of resin coatings. Trends which may be used to predict sol-gel performance with respect to differing materials and applications are analogous to those of prior non-corrosion resistant sol-gels, see U.S. Pat. No. 5,814,137 and U.S. Pat. No. 5,939,197.

The invented sol-gels may be produced as either water-based or alcohol-based mixtures. Previous water-based systems have alleviated flammability, safety, toxicity, and environmental concerns associated with alcohol-based sols, but alcohol-based sols allow better control of the amount of hydrolysis of the sol and exhibit the most favorable anti-corrosive properties when used in combination with zinc and phosphate containing compounds. Because of the more favorable anti-corrosive properties, the preferred sol is alcohol-based.

The preferred sol-gel coating is about 20 nm to 500 nm thick and produces a gradient from the metallic surface through the hybrid organometallic sol-gel film to the adhesive or resin matrix layer being applied to the metal. As with the Boe-Gel® sol, the organosilanes in the invented sol-gel covalently bond to or otherwise associate with the organic adhesive resin or primer layer. Covalent bonding also occurs between the metal component of the alkoxy metal and the metal surface at the interface of the sol-gel and metal surface. Thus, the components of the sol-gel form chemical bonds with the metal surface and the applied resin layer.

Critical to this film formation is the extent of hydrolysis of the zirconium organometallic compound during the process of coating formulation. Sufficient hydrolytic polymerization of the zirconium organometallic must occur so that the Zr does not react with phosphate, but the hydrolytic formation of the Zr-oxy-hydroxide network should not be allowed to go so far as to destabilize the sol. The Zr should remain sufficiently complexed so that it does not react with the phosphate from added phosphoric acid (or other $PO_4$ donor), giving the phosphate a chance to react with the Zn to form the nano-structured Zn phosphate. Accordingly, acetic acid concentration and the reaction time for the hydrolysis of the alkoxy Zr/Zn acetate mixture are adjusted to minimize reaction of Zr with phosphates.

As mentioned, the zinc phosphate and zinc oxide form within the sol as nano-structured particles. The particles are known to be nano-structured because the resultant film coatings are transparent, indicating that the particle sizes are below the wavelength of visible light.

The organometallic and the organosilane components of the sol-gel hydrolyze at different rates. If the sol is applied too shortly after being made, the organosilane may not be fully hydrolyzed. If the sol is not applied soon enough, the hydrolyzed silicon and organometallic components may condense among themselves, forming oligomers and networks. In the absence of the corrosion inhibitors, the ideal solution age is at the point that the zirconium and silicon are hydrolyzed sufficiently that zirconium and silicon react with the metal surface. However, the compounds added for corrosion protection in the invented sol react with the metal surface to form a stable interface.

In sols containing zirconium alkoxides, the zirconium and silicon components hydrolyze on a similar time scale when the zirconium alkoxide is mixed with glacial acetic acid, which stabilizes the fast reacting four-coordinate zirconate center. Given that the relative rates of the hydrolysis and condensation reactions involved in the sol coating process depend upon the concentrations of the reagents in the reactions, the metal alkoxide selected, and the water available for hydrolysis, the minimum amount of acetic acid necessary to form the zirconium-acetic acid complex is used.

Other organic chelating or complexing agents, such as citric acid, glycols, ethoxyethanol, or $H_2NCH_2CH_2OH$ can be substituted for the acetic acid, though acetic acid is preferred. The acidic catalyst promotes the hydrolysis reaction over condensation while a basic catalyst would do the opposite.

Alternative organosilane compounds which may be used in accordance with this invention (available from Petrarch or Read) for making the sol are: 3-aminopropyltriethoxysilane, p-aminophenylsilane, allyltrimethoxysilane, n-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl) methyldiethoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, and vinyltrimethoxysilane.

In the organometallics, the organo moiety preferably is aliphatic or alicyclic, and generally is a lower n-alkoxy moiety having 2-5 carbon atoms. Also, the organosilane includes typically an epoxy group for bonding to epoxy or urethane resins or adhesives or a primary amine for bonding to polyimide resins or adhesives.

Alternative alcohols for use in the invented sol are ethanol, isopropanol, or another lower aliphatic alcohol.

Alternative organometallics are cerium, yttrium, titanium, or lanthanum organometallics, such as yttrium acetate trihydrate or other hydrates, yttrium 2-ethylhexanoate, i-proproxyyttrium, methoxyethoxyyttrium, yttrium nitrate, cerium acetate hydrate, cerium acetylacetonate hydrate, cerium 2-ethylhexanolate, i-propoxycerium, cerium stearate, cerium nitrate, lanthanum nitrate hexahydrate, lanthanum acetate hydrate, or lanthanum acetylacetonate. The alternative organometallics may be used together with the zirconium alkoxides or in their place.

Referring to FIG. 1, production of an exemplary anti-corrosive sol-gel is accomplished by first mixing an organosilane or mixture of organosilanes (5) and an alkoxyzirconium organometallic salt (2) in a medium of water (3), methanol (4), and acetic acid (1). If GTMS and Zr (IV) n-propoxide are used as the organosilane and alkoxyzirconium organometallic salt, then the GTMS and Zr (IV) n-propoxide are preferably present in a molar ratio of about 5:1. The solids (GTMS and Zr (IV) n-propoxide) preferably comprise about 10% to about 12% of the total mixture, by mass percentage. The predominant component of the mixture is the methanol, at about 80% by mass. The water and acetic acid components of the mixture respectively comprise about 5% and about 1.5% of the mixture, by mass. A slightly higher concentration of reactants may yield better results in some situations, depending on the bonding materials and conditions. The ratio of GTMS to Zr (IV) n-propoxide may be adjusted to obtain the strongest surface adherence for each particular situation.

The base sol-gel mixture is stirred, preferably for 30 minutes or more, to allow for proper dispersion of the solids within the water, alcohol, and acid mixture. After stirring of the sol-gel mixture, the compound containing zinc functionality is added to the base sol-gel and stirred for about an hour. The zinc component is preferably added in amounts equivalent to between about 10 mol % and about 20 mol % of the solids in the sol-gel. After stirring with the zinc compound, the phosphate functionality is added to the sol-gel and stirred for about 30 minutes. The phosphate component is preferably added in amounts equivalent to between about 2 mol % and about 10 mol % of the solids in the sol-gel.

In order to take advantage of the full scope of the favorable adhesive properties provided by the invented anti-corrosive sol-gel, the metal surface must be properly prepared and the sol-gel must be properly applied. Techniques for applying a sol-gel that are equally applicable to the invented anti-corrosive sol-gel are found in Blohowiak et al., U.S. Pat. No. 5,814,137, and are incorporated herein by reference. As a variation to the sol coating process, a stabilizer may be applied to the surface to form a barrier film prior to applying the sol-gel film.

The invented anti-corrosive sol-gel provides dramatically improved anti-corrosive properties over previous sol-gels while maintaining superior adhesive properties between metallic surfaces and resin matrices, and while avoiding the use of environmentally hazardous chromate anti-corrosive compounds.

EXAMPLES

The coating of the invention was formulated, applied, and tested as described in the following exemplary process:

0.45 g of glacial acetic acid (99.7%) was added to 0.97 g of 70 wt % zirconium n-propoxide and mixed with stirring for 15 minutes to form mixture A. 1.5 g of deionized water was mixed with 25 g of methanol for 5 minutes to form mixture B to which was added 2.5 g of 96 wt % γ-glyciddoxypropyltrimethoxysilane. This mixture was stirred for 10 minutes to form mixture C. All mixtures were made at room temperature.

Mixture A was mixed with mixture C with stirring for 1 hour to form mixture D to which was added 3.48 g of zinc acetate dihydrate (10 wt % in water) with stirring for 30 minutes to form mixture E.

0.73 g of 85% phosphoric acid (10 wt % in water) was added dropwise to mixture E followed by 1 hour of stirring to produce the final coating solution. The mole ratio of the coating is 1.59 Zn:0.633 phosphate.

Aluminum 2024-T3 test coupons having a dimension of 3"×3"×0.062" were immersed in a deoxidation bath (Sanchem 1000) for 15 minutes at 38° C., rinsed in deionized water and dried. The coating was spin applied to the coupons directly after the deoxidation step and dried at 100° C. for 2 hours.

This represented a total mole % of Zn and $PO_4$ in the dry film of 11% and 5% respectively. This represents a stoichiometric excess of Zn to $PO_4$ required for the formation of the compound $Zn_3(PO_4)_2$. Hence the Zn is distributed as ZnO and $Zn_3(PO_4)_2$. The dry films appear transparent indicating particle sizes below the wavelength of visible light.

The resulting coatings were placed in an electrochemical cell as described by Buchheit et al. (Buchheit, R. G., Corrosion, Vol. 54, No. 1, Pp 61-72, January 1998) and exposed to 0.5 M aerated NaCl for 24 hours followed by a measurement of the electrochemical impedance under open circuit conditions. The corrosion resistance determined was measured for a statistically significant population of 8 specimens.

The results were presented as a log normal probability vs. the log of the corrosion resistance. The corrosion resistance has been demonstrated to correlate with time required for significant visual pits to form on the surface of the coated sample exposed to an environment specified by the ASTM B 117 (Buchheit, R. G., Corrosion, Vol. 54, No. 1, Pp 61-72, January 1998). FIG. 2 shows the test results for the coating as prepared above, labeled "Boegel with 5 mol % Nano-Zn Phosphate" compared to the comparable coating with no inhibitor and a trivalent chromium coating developed by the Naval Air Warfare Center (NAWC Cr3). A solid line representing the typical probability distribution for a commercially available chromate conversion coating, Alodine 1200, available from Parker-Amchem, Madison Heights, Mich., also appears in FIG. 2.

As can be seen, the nano-structured Zn phosphate based coating improves the corrosion performance (increased mean corrosion resistance and narrower distribution) as compared to the Boegel coating without the Zn phosphate inhibitor. In fact, under this test the Zn phosphate-inhibited Boegel performs more favorably to the chromate conversion coating and the Cr3 coating.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for promoting corrosion resistance of, and adhesion of resinous materials to, a metal surface, comprising the steps of sequentially:
    mixing an organosilane, organometallic, organic acid, water, and alcohol, and allowing the components of the mixture to partially hydrolyze;
    adding at least one component having zinc functionality and at least one component having phosphate functionality to the partially hydrolyzed mixture;
    forming nanostructured zinc phosphate ($Zn_3(PO_4)_2$) and zinc oxide (ZnO) phases in the mixture, wherein the zinc component and phosphate component are added in a molar ratio of from about 1.5:1 to about 5:1 ($Zn:PO_4$); and,
    applying the mixture as a coating upon the metal surface.

2. The method of claim 1, wherein the organometallic is selected from the group consisting of an alkoxyzirconium, yttrium acetate trihydrate, yttrium 2-ethylhexanoate, i-propoxyttrium, methoxyethoxyttrium, yttrium nitrate, cerium acetate hydrate, cerium acetylacetonate hydrate, cerium 2-ethylhexanolate, i-propoxycerium, cerium stearate, cerium nitrate, lanthanum nitrate hexahydrate, lanthanum acetate hydrate, lanthanum acetylacetonate and mixtures thereof.

3. The method of claim 2, wherein the organometallic is an alkoxyzirconium.

4. The method of claim 3, wherein the alkoxyzirconium is Zr (IV) n-propoxide.

5. The method of claim 1, wherein the organosilane is selected from the group consisting of 3-aminopropyltriethoxysilane, 3-glycidoxypropyltrimetheoxysilane, p-aminophenylsilane, allyltrimethoxysilane, n-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl)methyldiethoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, vinyltrimethoxysilane, and mixtures thereof.

6. The method of claim 5, wherein the organosilane is 3-Glycidoxypropyltrimethoxysilane (GTMS).

7. The method of claim 1, wherein the organosilane is GTMS, the organometallic is Zr (IV) n-propoxide, and the GTMS and Zr (IV) n-propoxide are present in a molar ratio between about 2:1 and about 5:1.

8. The method of claim 7, wherein the organic acid is acetic acid.

9. The method of claim 1, wherein one of the components having zinc functionality is zinc acetate dehydrate.

10. The method of claim 9, wherein one of the components having phosphate functionality is phosphoric acid.

11. A method for promoting corrosion resistance of, and adhesion of resinous materials to, a metal surface, comprising the steps of sequentially:
    mixing an amount of 3-Glycidoxypropyltrimethoxysilane, an amount of Zr (IV) n-propoxide, and organic acid, water and methanol and allowing the components of the mixture to hydrolyze to a first degree;
    adding at least one component having zinc functionality and at least one component having phosphate functionality to the mixture;
    forming nanostructured zinc phosphate ($Zn_3(PO_4)_2$) and zinc oxide (ZnO) phases in the mixture and,
    applying the mixture as a coating upon the metal surface.

12. The method of claim 11, wherein one of the components having zinc functionality is zinc acetate dehydrate.

13. The method of claim 11, wherein one of the components having phosphate functionality is phosphoric acid.

14. The method of claim 11, wherein the zinc component and phosphate component are added in a molar ratio of from about 1.5:1 to about 5:1 ($Zn:PO_4$).

* * * * *

UNITED STATES PATENT AND TRADEMARK OFFICE
CERTIFICATE OF CORRECTION

PATENT NO.       : 7,579,049 B2                                    Page 1 of 1
APPLICATION NO.  : 10/885197
DATED            : August 25, 2009
INVENTOR(S)      : Chung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1380 days.

Signed and Sealed this

Fourteenth Day of September, 2010

David J. Kappos
*Director of the United States Patent and Trademark Office*